US008474083B2

(12) United States Patent
Reiter et al.

(10) Patent No.: US 8,474,083 B2
(45) Date of Patent: Jul. 2, 2013

(54) APPARATUS AND METHOD FOR ENCOURAGING HAND WASHING

(76) Inventors: Michael Reiter, San Diego, CA (US); Thomas A. Arnold, Poway, CA (US)

( * ) Notice: Subject to any disclaimer, the term of this patent is extended or adjusted under 35 U.S.C. 154(b) by 346 days.

(21) Appl. No.: 13/008,828

(22) Filed: Jan. 18, 2011

(65) Prior Publication Data

US 2011/0119825 A1      May 26, 2011

Related U.S. Application Data

(63) Continuation-in-part of application No. 12/352,589, filed on Jan. 12, 2009, now abandoned.

(60) Provisional application No. 61/188,655, filed on Aug. 12, 2008, provisional application No. 61/010,705, filed on Jan. 11, 2008.

(51) Int. Cl.
*A46B 13/00*      (2006.01)

(52) U.S. Cl.
USPC .................................. 15/4; 15/21.1; 15/22.1

(58) Field of Classification Search
USPC .............................. 15/4, 21.1, 22.1
See application file for complete search history.

(56) References Cited

U.S. PATENT DOCUMENTS

| 3,439,370 A * | 4/1969 | McLaughlin ...................... 15/4 |
| 6,141,811 A * | 11/2000 | Nakamura ..................... 15/21.1 |
| 2008/0099043 A1 * | 5/2008 | Barnhill et al. ................... 134/6 |

* cited by examiner

*Primary Examiner* — Lee D Wilson
*Assistant Examiner* — Shantese McDonald
(74) *Attorney, Agent, or Firm* — Donn K. Harms

(57) ABSTRACT

A device to encourage hand washing which provides visual feedback to a user who can control a video game, blow bubbles, or view other visual feedback device while washing their hands. The device in one mode features at least one controller configured to operate when wet or continually doused with water while the user is washing their hands. The user may view a video or other means for visual interaction while washing their hands, and control a portion of the display with the controller. A video game or the like may thus be played by washing their hands thereby providing user encouragement to wash their hands. In a hand powered mode of the device, a compressible shell is employed to blow bubbles while squeezed and concurrently washing the user's hands. The controller or the shell may be employed with components providing a dermabrasive action against the palm of the user.

20 Claims, 8 Drawing Sheets

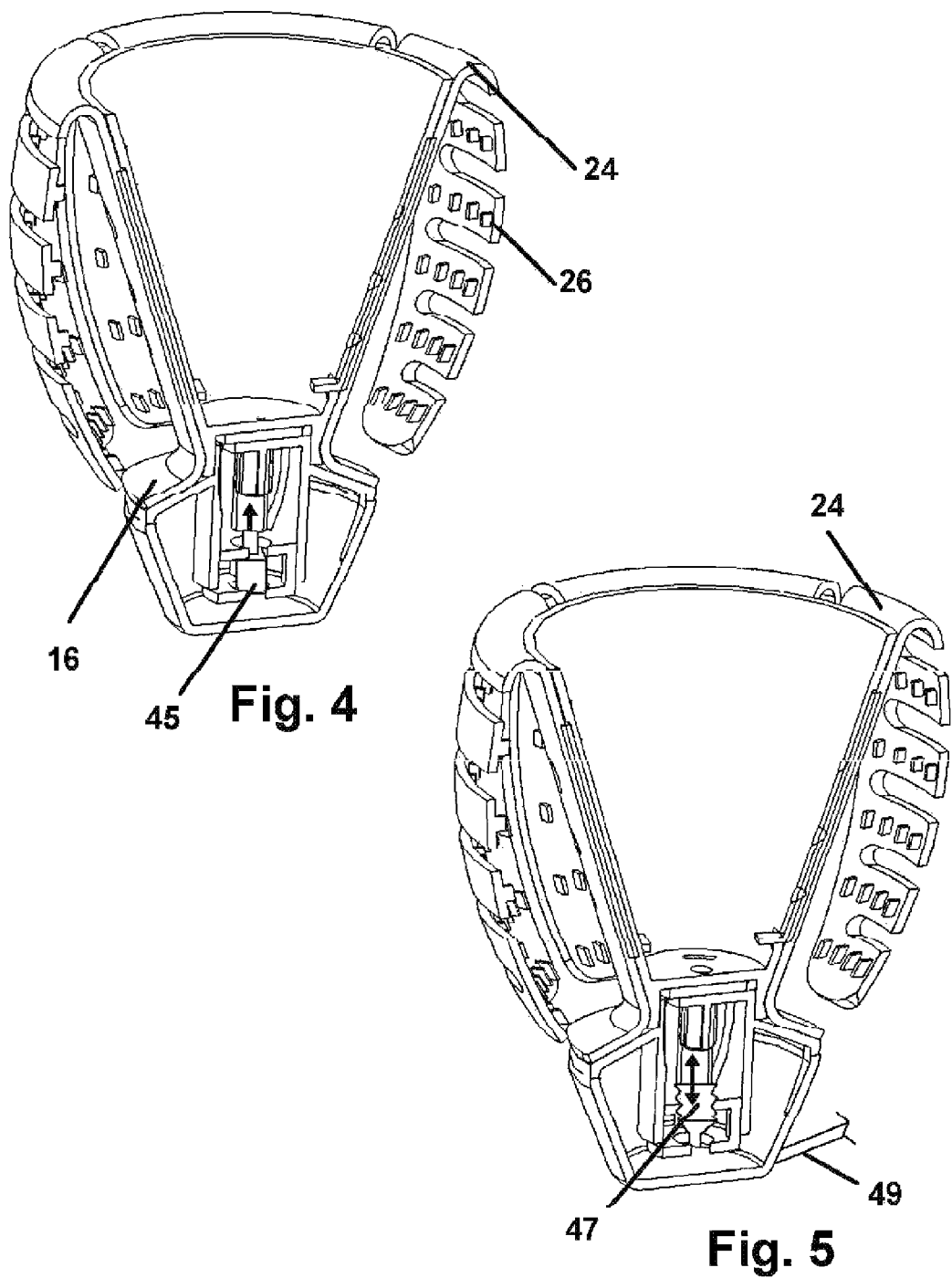

APPARATUS AND METHOD FOR ENCOURAGING HAND WASHING

This application is a Continuing-in-Part application from U.S. application Ser. No. 12/352,589 Jan. 12, 2009 now abandoned which claims priority from U.S. Provisional Application No. 61/188,655 filed on Aug. 12, 2008 and U.S. Provisional Application No. 61/010,705 filed on Jan. 11, 2008 all three of which are respectively incorporated herein in their entirety by reference.

BACKGROUND OF THE INVENTION

1. Field of Invention

The present invention relates generally to hygiene and hand washing. More particularly, the device and method herein disclosed and described relate to an apparatus and a method used for easily, quickly and effectively teaching children and young adults to properly wash their hands, and having means to encourage ongoing hand washing through the playing of games, or forming of bubbles, while the user is concurrently properly washing their hands.

2. Description of Related Art

The present invention is concerned with the problem of teaching and encouraging children and adults proper techniques and time frames for hand washing and encouraging such over time. While hand washing is a simple habit which will help keep a person healthy, the benefits of good hand washing only occur when a person actually washes their hands frequently and does so in a proper fashion.

Hand washing, when exercised regularly and using a proper technique, is one of the best ways for a person to avoid illness. While being a simple habit, which requires only soap and warm water, hand washing is rarely done properly or frequently enough by most people to reap the full benefits.

On any given day people accumulate germs on their hands from a variety of sources. This can include many sources of germs such as direct contact with other people, contaminated surfaces such as tables, escalator handholds, foods, even animals such as the family dog or cat. Subsequent to these contacts, if people don't wash their hands frequently and use the correct technique, they can easily infect themselves by touching their eyes, nose, mouth, or food. Further, failure to wash their hands will render a person a carrier who spreads germs to others by touching those people directly or by touching surfaces which they contact such as doorknobs.

As a consequence of inadequate hand hygiene, especially in children, infectious diseases are commonly spread from one person to another. Everything from the common cold and flu to gastrointestinal disorders, such as infectious diarrhea, are easily communicated from one person to the next.

Inadequate hand hygiene and improper hand washing techniques also contribute to food-related illnesses such as, *salmonella* and *E. coli* infection. In fact, according to the Centers for Disease Control and Prevention (CDC), as many as 76 million Americans get a food-borne illness each year. Of these, about 5,000 die as a result of their illness. Others experience the annoying signs and symptoms of nausea, vomiting and diarrhea. This chilling statistic could easily be reduced if food handlers and people eating prepared food, washed their hands with proper technique and for sufficient time periods.

Good hand washing techniques, if taught to children, will be a habit they can maintain the rest of their adult lives. However, many parents are not present in the home for sufficient time to render education on proper technique. Further, many parents themselves do not have knowledge of the proper hand washing techniques and time durations required for proper hand hygiene. Further, many children resist instruction on proper hand washing technique, or actually employing such techniques for the proper duration of time, finding it boring or time consuming. Additionally, some children, even with the knowledge of proper techniques, still lack encouragement or inclination to wash their hands regularly.

This is a sorry predicament since hand washing is especially important for children who attend child care and schools. Children younger than 3 years, in child care, are at greater risk of respiratory and gastrointestinal diseases, which can easily spread to family members and others in the community. Consequently, to protect children's health, it is important that both parents and child care providers promote sound hygiene, including frequent hand washing several times a day—not just before meals. Further, with children who already know proper techniques, it is important to provide them a means to encourage hand washing such as providing components configured to concurrently provide entertainment such as a game or bubble blowing device, and wash the user's hands.

As such, there is an unmet need for a device and method that will enable parents and child caretakers to actually get the children to wash their hands frequently and properly. Such a device and method should be employable by young children without the need for adult supervision and provide a means of continued encouragement for such young users to wash their hands properly and for a sufficient duration. Still further, such a device should be fun and emulate activities in which modern children already participate for fun, such as video games to encourage constant and repeated use, and for smaller children, a device which washes their hands while they perform an activity required by the device to reach a desired outcome. Finally, such a device should be adaptable to encourage use frequently by older children and adults so that frequent hand washing for sufficient durations becomes commonplace, and an activity which is actually enjoyed.

In this respect, before explaining at least one embodiment of the device and method herein in detail it is to be understood that the invention is not limited in its application to the details of construction and to the arrangement, of the components set forth in the following description or illustrated in the drawings. The invention is capable of other embodiments and of being practiced and carried out in various ways which will become obvious to those skilled in the art who read this specification. Also, it is to be understood that the phraseology and terminology employed herein are for the purpose of description and should not be regarded as limiting of the invention in any fashion.

As such, those skilled in the art will appreciate that the conception upon which this disclosure is based, may readily be utilized as a basis for designing of other structures, methods and systems for carrying out the several purposes of the present invention to instruct and encourage the art of hand washing. It is important, therefore, that the claims be regarded as including any such equivalent construction insofar as they do not depart from the spirit and scope of the present invention.

SUMMARY OF THE INVENTION

The disclosed device and method herein provide both a device, and a method employing the device, which provide encouragement for proper hand washing. The invention employs a combination of a process and a mechanism to operate according to the process, which renders hand washing both entertaining and consistently effective. By employing conventional electronic game elements and input devices adapted to provide proper hand washing, or by providing components which concurrently scrub the hands and blow bubbles when operated while the user is playing, the device provides entertainment in a way that ensures the recommended duration and method of hand washing is achieved by the user. However, the device, because its operation operates to scrub the skin with soap, removes the need for any actual skill on the user's part for doing so. Because the device is fun to operate, it encourages use for sufficient durations to disinfect hands by making the act play time.

In this fashion, the device and method herein, scrubs the user's hands during use and reduces the amount of dirt spread about the home by hand contact, but more importantly prevents the ingestion and transmission of harmful germs.

In one mode, emulating an operational action of an input for an electronic toy, the device employs an input device in the form of a controller which is adapted to operate inside the wet confines of a conventional household sink. The input device comes in a form easily employed by a child or adult in that it operates much the same as a game joystick or a game controller. While the device will operate with one joystick-like or other game controller, hand washing is an act that employs both hands and consequently the game controller provides two hand-manipulable controllers adapted for input in the wet environment of a sink, both of which are manipulated to play the game or otherwise operate the device.

Each controller, which controls a video or other game adapted to the use of a hand controller, is structurally adapted to thoroughly clean all surfaces of the user's hand while being used to control one or a plurality of operably engaged game devices or entertaining devices, such as a doll, and using software adapted to the task. In a simple mode of the device, which provides a novel component to encourage hand washing, the controller will employ one game controller such as a joystick, or other controller that may be gripped by a hand to control a game or entertaining remote device.

Manipulation by the user of the game controller, and optionally the base for the controller, in the electronic mode of the device, provides input signals to a microprocessor unit, such as a computer or electronic gaming device. Of course, a pneumatic or other mode of the device may be employed to control a game or other entertaining component and would still be in the scope of the device herein.

In the electronic mode of the device, a video display operatively engaged to the computer, provides a visual interface means for the user to operate the game, or other video being displayed, by their movement and manipulation of the controller in the sink. The controller, if elongated sufficiently to grip, for instance a joystick, may be adapted for slight moving frictional engagement with the palm of the user's hand such as rotating or vibrating it while in the palm of the user's hand during use to thereby enhance cleaning.

During manipulation of the game controller, to operate the game or other software-provided video being displayed on the video display, the user is concurrently washing their hands. The software which the controller operates, will interface with the signals generated by the user manipulation of the controller, with the video game or other entertaining or educational material depicted on the video display. Movement by the user of the game controller and/or its control components causes interaction with the displayed video. For instance, the controller may control the movement of an iconic cursor on the video display which moves about a computer generated game or entertaining video on the display. The software would be adapted to have the user operate the controller at least for sufficient time to properly wash their hands. Optionally but preferred, the software running on the computer or game processor will have modes of operation where the software actually elicits movements by the user's hands, which combined with the actions of the controller and hand engagement, which will enable a more thorough washing of the hands.

In use in this mode of the device, the joystick or other lever or button components of the controller are also adapted to clean the palm-side of the hands and fingers. While a significant hand-cleaning improvement is provided just by the user gripping a control component during use, in another preferred mode of the device, a surrounding skirt is also provided. The skirt, during movements of a control component, such as a lever or joystick, during use by the hands by the user to control the game, concurrently provides a means to scrub the back side of the hand and fingers which currently is provided by bristles or other projections extending toward the axis of the joystick. During use, the bristles will wash and scrub the back side of the hands and fingers of the user, while concurrently the gripped control portion is washing the palm side of the hand and fingers. In this fashion, the bristles will clean the back side of the hand and the lever, or joystick, or control ball, or other hand-gripped component of the controller, will wash the palm side of the hand.

In another preferred mode of the device, which provides a water reservoir, the skirt may also be formed as a frusto conical interior cover to the gripped-control portion of the controller, such as the depicted joystick. The skirt, as depicted, curves at a terminal end to form a back wall which engages the base of the gripped-control such as the depicted joystick. A cavity is thus formed between the back wall and the covered gripped-control portion of the controller, as well as a reservoir in the central portion of the cover.

This cone shaped skirt will employ an angle between 50 to 70 degrees which provides for easy egress and ingress of the user's hand to manipulate the joystick or other gripped-control component, or remove their hand from the device. With a portion of the cone covering the gripped-controller in an angled fashion, an increased cleaning of the palm side of the hand is provided by the constant slipping or upward translation out of the user's hand by the cone cover when it is wet with soapy water. Experimentation has found that a 60 degree angle away from the axis at the base of the contact with the gripped-controller works best. This is because if the angle is too narrow then the cone will not easily squirt up out of the hand when squeezed, but if the angle is too broad then the cone will not feel comfortable within the user's hand.

Further, the diameter of the interior portion of the cone surrounding the gripped-controller component must be sized so the hand can easily grasp it. For small children this may be reduced, whereas, with adults or adolescents it will increase to adapt to their larger hand size.

The surface of the cone forming the skirt surrounding the gripped-controller to define the cavity, is populated with a means for scrubbing the palm side of the hand. Currently, this means for scrubbing employs a plurality of small scrubbing bristles, however, other scrubbing projections may be employed. The cone surface surrounding the gripped-controller also forms a depression providing a water reservoir and drain holes which allow water to flow from the faucet into the depression. From the depression, water communicates through the drain holes onto the hand of the user.

The skirt in either mode of the device may be static and thereby clean the exterior of the hands when the hands move the gripped-controller, or they may rotate to provide additional inputs to the game for the user to control the video on the video display. If employed in a rotational fashion as an input, the skirt is a rotation cam. The bio mechanics of the human hand, when it grasps a cone, creates a twisting motion of that cone. The rotation is approximately a quarter-rotation during the translation of the cone. The rotation cam-pin of the skirt works with the follower-track on the frame or base to accentuate this natural motion. A return spring assures the mechanism returns to its start position when the user's grip is released.

The base provides a mount for the gripped-controllers, and if employed, the skirts and cone portions. It is of substantially rigid construction to provide stability and mounting for the other primary components. In a preferred mode of the device, the axis of the two gripped-controllers and surrounding components are angled away from the centerline of the base at an included angle of about 30-degrees. While the device yields a vast improvement to hand cleaning without this angled engagement on the base, it has been found the angled engagement improves the ergonomics of holding the control with both hands and to allow them to straddle the faucet within the sink. Thus, the angled engagement from the base is preferred to allow a straddling of the faucet at this angled position by both hands which improves the flow of water to each hand and allows the controller to more easily fit within the sink.

Activation of the device can be provided by any number of means of activation as would occur to those skilled in the art. A first means of activation would employ a soap dispenser, which when pressed to dispense soap, will signal the computer to energize the video display and controller for a defined period of time to wash a user's hands. Or, gripping either gripped-controller, may also initiate a signal or an accelerometer or similar motion detector mounted on the base, will continuously monitor the controller for movement and initiate a signal to the computer to energize the components and to run the appropriate software program for the user for the appropriate duration to wash their hands properly.

The gripped-controllers if used without the conical skirt, may vibrate or spin in the user's hands during use to better scrub the palms and fingers. A soft covering adapted to cleaning skin would cover the exterior of the gripped-controller.

Also, in a particularly preferred mode of the device, software running on the computer, game console, or other micro processing unit adapted to the task, may be adapted to elicit movements of the users hands during use, to provide a better washing of the hands. This may be done by providing the video to the video display for which the user employs to controller and gripped-controllers to manipulate a cursor or other graphic depiction on the video display. Making the displayed game or track in particular fashions can induce movements from the user which will better provide cleaning of the hand surfaces.

The soap dispenser will dispense any commercially available hand cleaning agent and can be any soap dispenser adapted to the task. The device may be provided with a housing or switch to initiate the signal to the computer to start a session if the initiation signal is provided by soap dispensing.

In use, the user would dispense soap to the hands with the dispenser and then grab the gripped-controllers on the controller. The computer sensing either the soap or movement of the controller will move from a software induced sleep mode, to an active mode where signals are sent to the video display to energize and the computer awaits input from the controller caused by user movement.

The user gripping the gripped-controller will then place the controller under the running faucet and wet their hands directly or through filling the reservoir if the conical cover is employed. Thereafter, the computer will run gaming or other software which requires user manipulation of the controller and the gripped-controllers to play. The controller, as noted, may have an accelerometer or other motion sensor to provide input to the computer to be used in the game. The gripped-controllers will provide conventional signals as are employed from conventional gripped-controllers.

All electronic parts in the controller are sealed to prevent water intrusions using conventional means. Electrical power for the controller will be provided by conventional batteries or low power transformer, as is the case also with the computer and video display. Communication of signals from the controller to the computer may be wired but would be preferably wireless to alleviate the need for wires around a sink. The video display and soap dish activation switch may be hard wired or also may be wireless.

In yet another particularly preferred mode, the device employs a generally spherical and hollow squeezable shell of soft malleable rubber. Like that of the first mode, the shell has pliable projections extending radially therefrom which provide a means to passively scrub the user's hands when the shell is squeezed to operate the device to play a bubble game.

A bladder is housed within this shell and acts as a reservoir for air. An air exhaust opening is provided employing a one way check valve, or other means for one way communication of air from the interior chamber of the bladder when compressed. The valve provides a communication of air stored within the interior chamber of the bladder to the outer shell. This provides for a one-way forced communication of air when the bladder is compressed, thereby providing a means to inflate a bubble when the device is squeezed by the user.

As in the mode of a game controller, this mode of the device where the user concentrates on the game of squeezing the shell to concurrently compress the bladder and cause a communication of air from the interior chamber through valve to form bubble, is passively having their hand scrubbed by the pliable projections.

The one way valve at the air exhaust from the bladder, prevents water and soap from entering the bladder when deposited from a dispenser. Further, the valve provides a means to prevent the bubble from deflating once inflated by the user during the game. At an intake aperture communicating with the interior chamber of the bladder there may be located a secondary check valve. If employed, this check valve provides a means to communicate air into the interior chamber, and re-inflate the bladder to replace the vented air which exhausted the interior chamber of the bladder when it was squeezed and deflated by the user. This secondary check would be positioned within a passage way communicating with the bottom of the bladder and the outer shell. Alternatively and currently preferred, the secondary check valve may be replaced by a sufficiently axial aperture in the wall of the bladder which vents at a rate controlled by the diameter thereof, when the bladder is squeezed. The axial aperture or pathway is formed small enough that the majority of air venting from the compressed bladder vents from the one-way valve at the air exhaust aperture. However, by maintaining the passage open and without a check valve, it has been found that the axial aperture provides a relief from over pressure of the one way valve exhausting of air.

In operative use, to play the game, the user holds the shell in their hand, facing the ground, and then dips the valve into the reservoir providing hand washing solution leaving. A thin layer of the solution forms over the exhaust aperture positioned adjacent to the one-way valve during the mating with the reservoir. Thereafter, when the shell is held with the valve upright, and squeezed, it compresses the bladder to vent air through the one way valve, against the film layer and thereby produces a bubble. As noted, when the bladder is decompressed, air will not pass back into the bladder through a one-way valve located in the exhaust aperture. Instead, the bladder will refill through the axial intake aperture or the secondary check valve located in the axial intake aperture of the bladder.

It is preferred that the exhaust aperture employs a diffusing means to regulate the flow of exhausted air vented through the one way valve from the bladder. This diffusing means also provides a means to prevent a popping of the forming bubble caused by excess air volume vented through the one way valve during a compression of the bladder. Instead of a direct jet or airflow, air exhausted from the bladder hits a shield of the diffusing means and exhausts at its perimeter to form the bubble.

Concurrently, when the shell is squeezed and is in an upright position, excess solution communicates down the exterior surface of the shell and soaks the projecting members extending therefrom to aid in the members act of scrubbing the hand of the user holding it. This soap also communicates through apertures in the shell to an interior foam layer, where it will form foaming bubbles that exhaust from the apertures. The playful and positive reinforcement of the act of the game of bubble forming, requiring the user to compress the shell, provides a means to induce the user to continue to squeeze the shell to form bubbles, and assures that the device washes their hands passively. Thus the user, especially a child, while enjoying the game controlling the act of blowing bubbles, is continuously scrubbing their hands.

As noted, the shell has a plurality of smaller apertures communicating between the inner and outer surfaces of the shell. These apertures provide a means to communicate hand washing soap from the exterior of the shell, to an intermediate layer of soft open foam material which is operatively positioned between the exterior surface of the bladder and the interior surface of the shell. The area surrounding these apertures of the sphere-shaped shell incorporates the array of pliable members extending radially from a connection to the exterior surface of the shell. The pliable members are preferably formed of plastic or rubber material which bends but will generally bias toward their original elongated position and against the skin of the user. Once released the members return to their original radially projecting position.

These flexible members, biased against the skin of the squeezing hand of the user during the game, provides a playful way to cause the user to gently scrub debris from the nooks and crannies of users hands as well as disperse the soapy solution communicated through the apertures of the sphere-shaped shell.

As noted, within the shell and between the bladder and interior surface of the sphere-shaped soft shell is an intermediate layer of soft open foam material. This soft foam is positioned between the bladder and shell to ensure a sudsy lather is formed during squeezing of the shell. During use to blow bubbles, this lather is communicated from the device through the apertures in the sphere-shaped shell and to the elongated members and hand of the user when squeezed. Thus the foaming soap is deposited between the projecting members and communicated to the user's skin, each time the shell is squeezed which is much more fun than pushing a button on a bottle for gel or liquid in conventional hand washing.

This particularly preferred mode of the device, in addition to the whimsical shell with radially projecting flexible members, employs a mating base element. This base element provides a means to store the soap or hand washing solution for use during play, as well as providing a means to communicate that solution to form the film layer in the bubble-producing exhaust aperture which receives air from the one way valve adjacent to the exhaust aperture of the hand washing portion of the shell of the device.

The base component is formed of a compressible sidewall and thereby reacts to compression similarly to a bellows. After being compressed by engagement with the planar surface surrounding the exhaust aperture, during the application of the solution to the hand washing component, the base component is configured to self rebound to its original shape. This rebound action provides a means to draw any excess soap back inside its internal reservoir. This action prevents potential spilling or splashing of the liquid. An interior stop, located inside the reservoir, provides a means to dispense a measured amount of soap by preventing over compression of the bellows and only allowing compression a measured distance.

Once compression using the hand washing component is finished, and soap is dispensed, the hand washing component is tipped upright by the user and separated from the reservoir base. Soap solution remains in a measured amount in an annular cavity of the valve component surrounding the diffuser. The depth of the annular cavity provides a means to place a measured amount of soapy solution communicated during compression of the base, to the hand washing component. Surface tension and the nature of such thick soapy solutions causes this volume of soapy solution to remain in the cavity during transition from an inverted position against the base, to the upright or bubble-blowing position prior to a squeezing.

It is thus an object of this invention to provide a device which cleans the hands of the user while they are employing the device to play or as an interface with a game or other computer generated video display.

It is a further object of this invention to provide such a device which will self-time and can also provide software to elicit movements by the user's hands to better clean them during use.

A further object of the invention is the provision of a means to induce squeezing by the user during play, and cause a concurrent scrubbing of the skin of the hand.

Yet another object of the invention is the employment of bubble-forming resulting from such squeezing, to produce the bubbles as a playful and positive inducement and reinforcement of hand washing caused by this squeezing.

These and further objectives of this invention will be brought out in the following part of the specification, wherein detailed description is provided for the purpose of fully disclosing the invention without placing limitations thereon.

With respect to the description provided herein, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the descriptions provided herein are considered as illustrative only of the principles of the invention.

Further, since numerous modifications and changes will readily occur to those skilled in the art, upon reading this disclosure, it is not desired to limit the invention to the exact construction and operation shown and described, and accordingly, all suitable modifications and equivalents which may be resorted to, are considered to be within the scope of this invention.

BRIEF DESCRIPTION OF THE DRAWINGS

The accompanying drawings, which are incorporated in and form a part of this specification, illustrate preferred embodiments of the invention and together with the description, serve to explain the principles of this invention.

FIG. 4 shows another mode of the device of FIG. 3 wherein the skirt is engaged to an electrical switch adapted to signal an input during upward slippage in the user's hand.

FIG. 5 depicts another mode of the controller similar to FIG. 4 wherein the skirt is engaged to operate a bellows on each upward translation in the user's hand.

DETAILED DESCRIPTION OF THE PREFERRED EMBODIMENTS OF THE INVENTION

In the following description of preferred embodiments of the device and method of employment thereof, reference is made to the accompanying drawings that form a part hereof, and in which is shown by way of illustration specific embodiments in which the invention may be practiced. It is to be understood that other embodiments may be utilized and structural changes may be made without departing from the scope of the present invention and any and all changes or adaptations which may be made by those skilled in the art, are considered to be within the scope of the claimed device and method.

Figure 1:
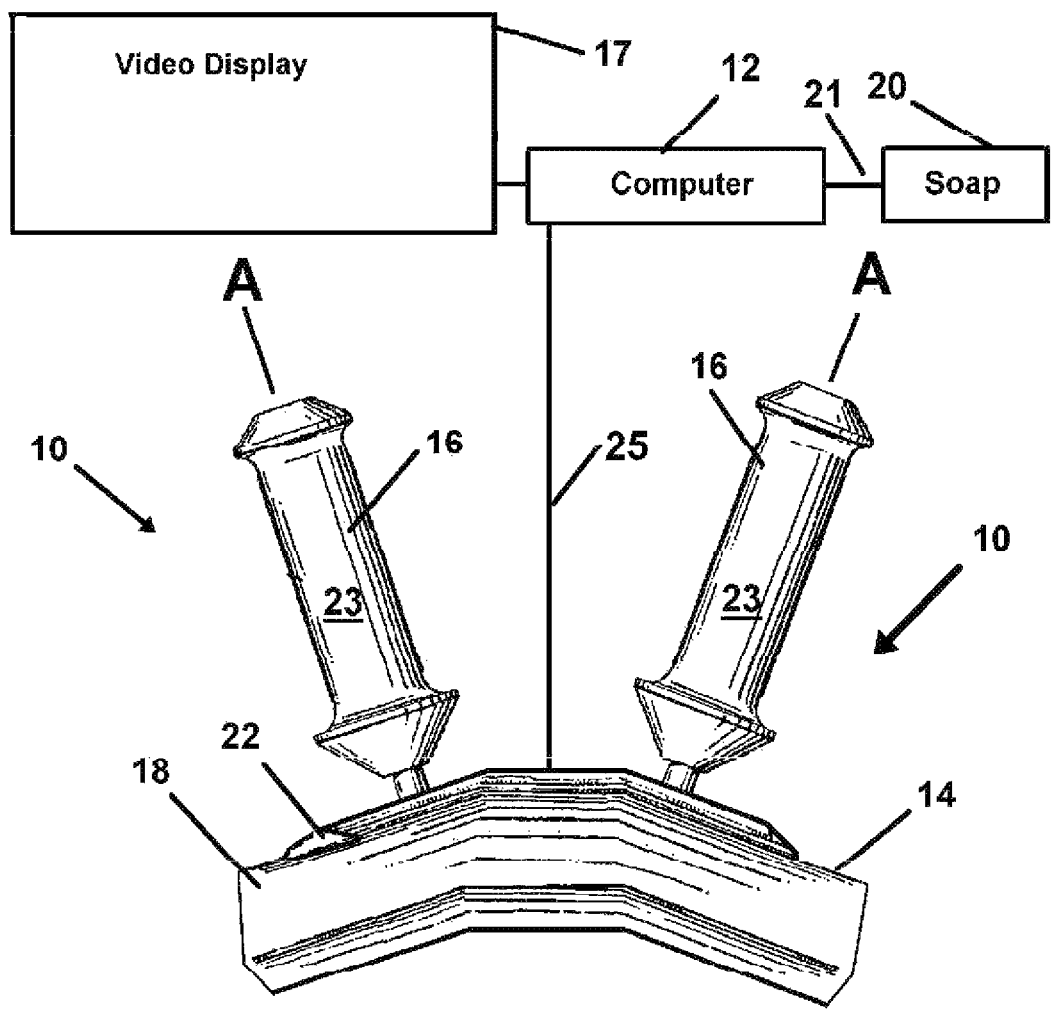
FIG. 1 shows a representation of the basic mode of the device employing a controller with gripped controller components such as joysticks, or levers, operatively engaged to interact with a visual display.

Referring now to FIGS. 1-12 wherein similar parts of the invention are identified by like reference numerals, there is seen in FIG. 1, a representative view of the components of a particularly preferred mode of the disclosed device 10. The device 10 employs operatively engaged components which will be familiar to youthful users in that they emulate the play of conventional video or interactive games where the user inputs signals from a controller 14 and therefor encourages use of the device 10 amongst the young.

In the electronic mode of inputting signals from the user, a computer 12 is provided along with software adapted to receive input signals from the manipulations of a controller 14 and allow the user to interface with the video depictions on a video display 17 operatively communicating with the computer 12. As noted, the controller 14 has all electronics sealed in a manner which will protect them from operating in the wet environment of a sink.

In use, as a means to encourage hand washing by an individual and facilitate a better outcome, a means for gripped control is shown as at least one gripped-controller 16 such as a joystick, which is operatively engaged to the base 18 of the controller 14. While a joystick is shown in many of the drawings as a favored mode of a gripped-controller 16, those skilled in the art will realize that any controller adapted for gripping by the user's hand and to work in an aquatic environment, which will allow the user to interact with a display component, such as a member or lever, or simply the skirt 24 shown in FIGS. 2-6 will work. As such, it is anticipated that other control inputs may be employed that will allow the user to clean their hands during use, and any such controllers as would occur to those skilled in the art, which may be gripped by a user washing their hands and concurrently controlling or interfacing with a viewable display, is within the scope of this patent. Further, while the device 10 will work with one gripped-control such as a gripped-controller 16 in a reasonable fashion, users conventionally wash both hands at once consequently two gripped-controllers 16 such as joysticks 23, extending from a mount of some type such as the base 18, are the preferred mode of the device 10. I Still further, the invention employs a gripped-controller 16 for the user to interact with a display screen. The display screen may be a video display 17 such as an LCD screen, or might be a small water filled or aquatic display 19 as in FIG. 6, or it may be any means for visual interaction with a gripped-controller 16 operated by a user where hand actions of the user on the gripped-controller 16 will cause a reaction on the display screen. Consequently, any display which will interact with a gripped-controller 16 while the user is washing their hands using the gripped-controller, as would occur to those skilled in the art, is anticipated within the scope of this patent.

In a first preferred mode of the device 10 shown in FIG. 1, electronic means is employed to encourage a user to play a game and concurrently wash their hands and to increase the efficiency of the act. In this mode, a gripped-controller 16 is provide by the controller 14 along with water from a faucet (not shown) and soap from a soap dispenser 20. A means for electronic switching of the device 10 into operational mode may be provided by a switch, proximity sensor, or in a current preferred mode, a soap dispenser 20 having an electronic signaling means to communicate a signal 21 to the computer 12 that a session has begun. Thus, the first action by the user in dispensing soap from the dispenser 20 will initiate the computer to move to operational mode, energize the video display 17, and run the software for the controller 14 to operate.

The user with soap on their hands will position the controller 14 under the water flow from the faucet in a sink, whereby the hands will be wetted. Thereafter, using the gripped-controllers 16 shown as the joysticks 23 in each hand, the user inputs signals 25 to affect the displayed video on the video display 17. A game or other means to allow user input signals from the gripped-controller is provided by the software running on the computer 12. In this electronic mode, users by their movement and manipulation of the joysticks 23 or other gripped-controller over the sink, will cause a viewable action on the display 17 which interacts with what is being displayed.

Additional input signals 25 may be provided by a motion sensor such as an accelerometer 22 engaged to the body of the controller 14, which will sense the tilt and movement of the controller 14, and provide additional input signals which will have some interaction with the visual display to run the game or other video displayed on the video display 17. Optionally, and in a particularly preferred mode, the gripped controller 16 may be adapted to rotate or vibrate or translate in the palm of the user's hand during use to enhance cleaning. This can be done with a means to generate a movement 27 (FIG. 3) to the gripped-controllers 16 while being gripped by the user in an as-used position, such as one or a combination of a small motor to rotate the gripped-controllers 16 or a vibration generation device being engaged to the gripped-controllers 16 or means to translate the gripped-controllers such as a solenoid. This rotation, translation, or vibration, as noted may be accomplished with simple motors, or solenoids, or vibrators in the controller 14 which are operatively engaged to the gripped controller 16. The movement thereby provided while the user holds the gripped-controller 16 provides means to scrub the palms of the user's hands and better clean and exfoliate the skin of the user thereby removing more germs and dirt and the like.

The gripped-controllers 16 and interaction by the user with the software on the computer 12 significantly enhance hand cleaning. However, in another particularly preferred mode of all embodiments of the device 10, the axis of both of the gripped-controllers 16 and any surrounding components, are angled away from the centerline of the base at an included angle "A" of about 30-degrees. This angled engagement is particularly preferred because it improves the ergonomics of holding the control 14 with both hands, and to allow users to straddle the faucet and place the device in the small confines of a sink since it shortens the overall length of the base 18 when measured end to end in a straight line.

Figure 6:
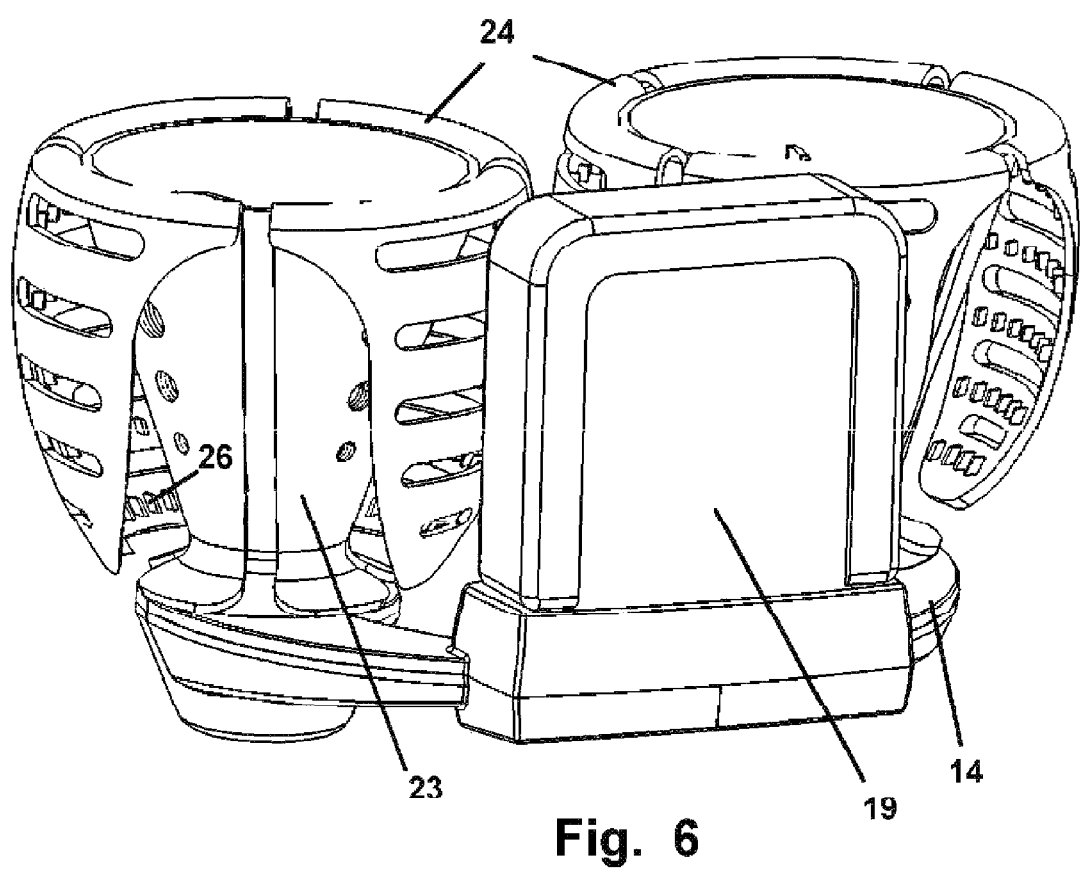
FIG. 6 depicts a mode of the device where it is self contained and the controllers input either electronic or pneumatic signals to interact with the display which may be an electronic screen or a water based display.

In use, software adapted to run on the computer will intake signals 25 generated by the user manipulation of the controller 14 and the gripped-controllers 16, and employ those signals to run or play or interface with the video game or other media depicted on the video display 17 or in the case of the device 10 in FIG. 6, the aquatic display 19. Transmission of signals 25 from the controller 14 to the computer 12 as signified by line 25, may be by conventional wired or wireless communication using WiFi, BlueTooth, or Infrared signals communicating the user movements of the controller 14 and its components. The computer 12 would also have a timer in the software or otherwise running to end the game after sufficient time has elapsed for hand cleaning.

Figure 2:
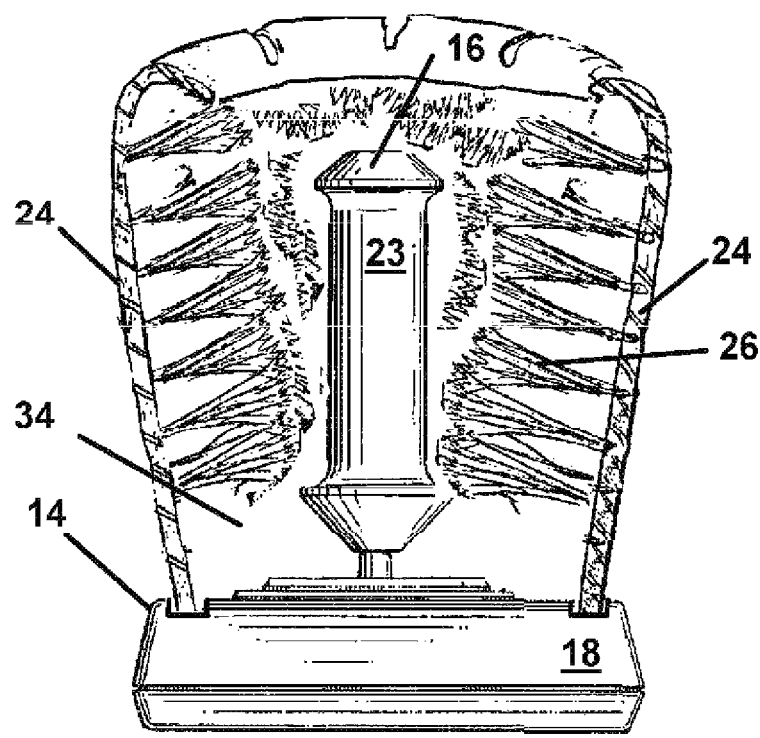
FIG. 2 depicts a mode of the device wherein a skirt surrounds a gripped controller, such as a joystick or lever, which is perpendicular to the base.

In another particularly preferred mode of the device 10, shown in FIG. 2, a skirt 24 is engaged to the controller 14 which is shown engaged to a gripped-controller 16 in the form of a single joystick 23 but can easily be configured with two gripped-controllers 16 as in FIG. 1, and perpendicular as in FIG. 2, or at the preferred 30 degree angle "A" of FIG. 1.

In this mode, the skirt 24 surrounds approximately half of the circumference of the gripped-controller 16. Bristles 26 provide a means to scrub the back side of the hand and fingers while the user manipulates the joystick 23 to control or play the video display 17. As in all modes, the gripped-controller 16 may rotate or vibrate or translate during use to clean the palms better and provide the means to scrub which exfoliates skin cells.

Figure 3:
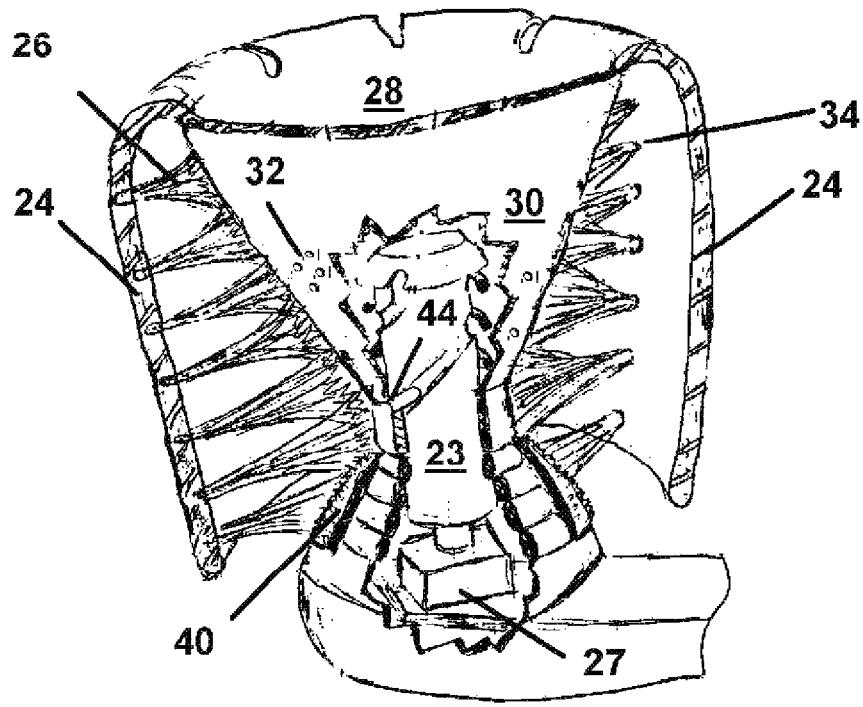
FIG. 3 is a perspective cut-away view of a mode of the gripped-controllers having a frusto conical covering over the gripped-controller extending to form a skirt which slips during use thereby providing a means to scrub the hands of the user.

In another preferred mode of the device 10 shown in FIG. 3, additional utility is provided by a water reservoir 28 formed of a frusto conical shape. The skirt 24 may also be formed as an extension of the frusto conical interior skirt 30 which fits over the gripped-controller 16. The reservoir 28 is provided by the central section of the conical shaped portion which can collect water dispensed from a faucet for continual communication through apertures 32 to the hands of the user during use.

This cone shaped interior skirt 30 will best employ an angle between 50 to 70 degrees away from the center axis of the gripped-controller 16. A cavity 34 is formed between the interior skirt 30 portion and the skirt 24 which is accessible by the two open ends at the termination points of both skirts.

Particularly preferred in this mode is to form the interior skirt 30 portion covering the joystick 23 in an angled fashion which provides increased cleaning of the palm side of the hand as the angled sides provide a means for slipping of the interior skirt 30 upward and out of the user's hand when it is wet with soapy water. Formed of flexible material, or translatably engaged components as in FIGS. 4-5, or both, the interior skirt 30 may also have short bristles 40 extending therefrom or some other abrasive means to clean the palms of the hands better.

As noted, the skirt 24 may be static in mounting to the base 18 or the gripped-controller 16 and thereby clean the exterior of the hands when the hands move the gripped-controller 16, or the skirt 24 may provide another moveable input for the controller 14 by rotating in communication with electrical sensors 44 to provide additional signals to the game for the user to control the video on the video display 17.

In a method of use of the device 10 the user would dispense soap from the soap dispenser 20 to the hands and then grip the joysticks 23 on the controller 14. The computer 12 sensing either the soap dispensing from a switch or movement of the controller 14 will move from a software-induced sleep mode, to an active mode where signals 25 are sent to the video display 17 to energize, and the computer 12 awaits input from the controller 14 caused by user movement.

The user gripping the gripped-controller 16 will then place the controller 14 under the running faucet and wet their hands directly or through filling the reservoir 28 if the conical cover having the interior skirt 30 is employed. Thereafter the computer 12 will run gaming or other software which requires user manipulation of the controller 14 and/or the gripped-controller 16 to input signals which interact with the video display 17. The controller 14 as noted may have an accelerometer 22 or other motion sensor to provide input to the computer to be used in the game. The gripped-controllers 16 during play will provide conventional signals as are employed from conventional joysticks used on computers or signals adapted to the task in a similar fashion. A timer in the computer 12 or software induced will end operation of the device 10 once a sufficient time is ascertained to have washed the user's hands.

In FIG. 4 there is shown another mode of gripped-controller 16 the device of FIG. 3 wherein the skirt 24 is engaged to an electrical switch 45 adapted to output a signal during translation of the skirt 24 from upward slippage in the user's hand. The upward movement will cause the switch 45 to output a signal in electronic mode to cause a visual reaction on the display or video display 17.

FIG. 5 depicts another mode of the gripped-controller 16 similar to that of FIG. 4 wherein the skirt 24 is engaged to translate upward during use and slippage in the palm of the user. This translation of the base of the skirt 24 serves to operate a bellows 47 during upward and downward translation caused by the user's hand. The bellows 47 will thus output a pneumatic signal through the conduit 49 which can either be used to activate some electronic signaling device for an electronic signal, or may be employed to interact with a water based aquatic display 19 shown in FIG. 6 with bubbles or movement of some aspect of the aquatic display 19.

There is depicted in FIG. 6, a mode of the device 10 where it is self contained and the controller has two gripped-controllers 16 having skirts 24 thereon and the conical slipping interior. While depicted as an aquatic mode of the device 10 the aquatic display 19 may be replaced with a video display 17 and the bellows 47 replaced with electronic inputs to form a fully portable electronic mode of the device 10. A microprocessor as a computer 12 would be mounted within the base along with batteries for power in the electronic mode. As depicted in the pneumatic mode for signaling from the gripped-controllers 16, the device will allow user interaction with the aquatic display 19 by movement of the gripped-controllers 16 which will generate pneumatic or hydraulic signals from a pumping means such as the depicted bellows 47.

Figure 7:
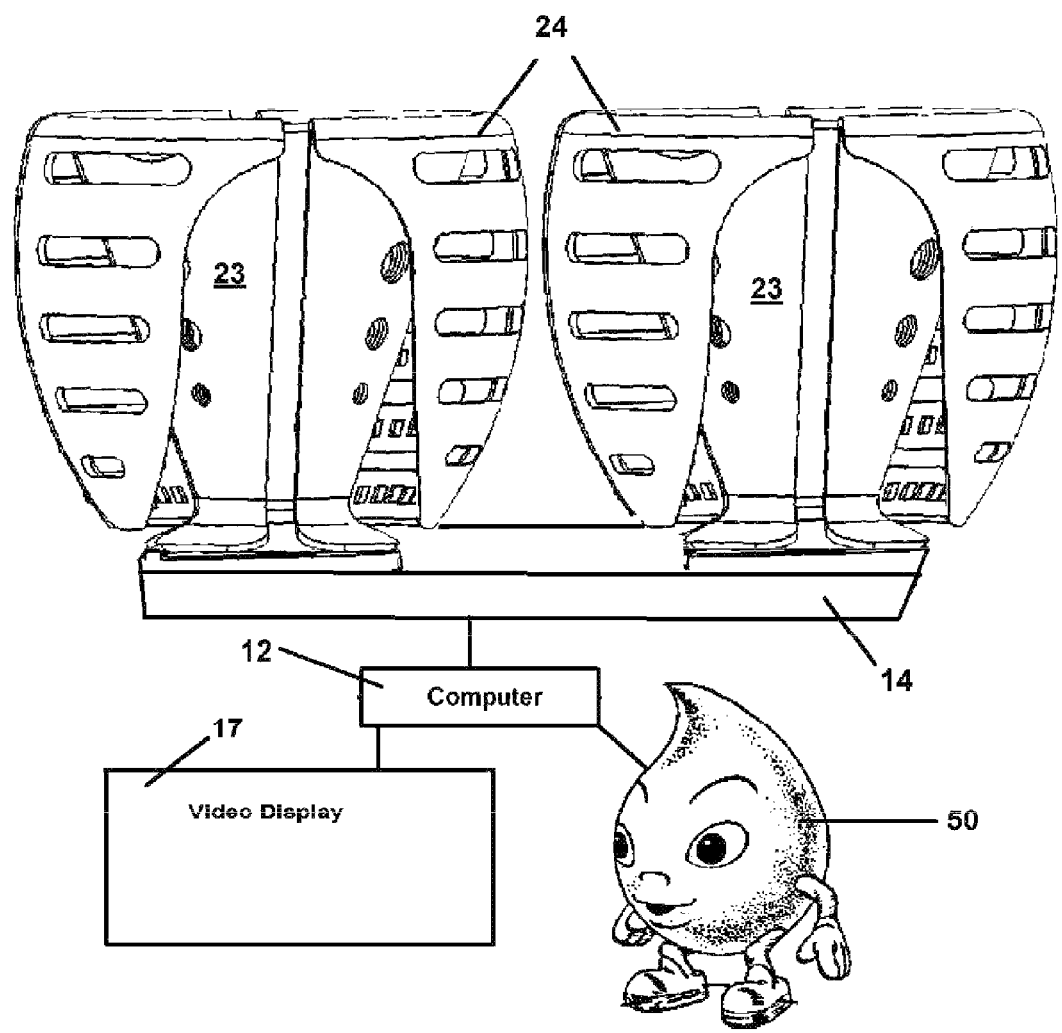
FIG. 7 shows a mode of the device which provides for interaction with a three dimensional doll or plush toy or the like, through movement of the gripped-controllers.

As noted above, the user action with the gripped-controllers 16 will generate a signal to allow the user to interact with a means for visual feedback or play based on their hand movement. In FIG. 7 there is shown a mode of the device 10 wherein a doll or plush toy such as a teddy bear, or other three-dimensional interactive component 50 provides the means for the user to interact with a visual feedback device by their hand movements while gripping the gripped-controllers 16. In this mode, the user manipulating one or both gripped-controllers 16 will cause the interactive component 50 to move or talk or take some other action that may be viewed and affected by the user through movement of the controller 14 and/or the gripped controllers 16. A computer 12 running software adapted to the task would be provided separately or mounted on the device 10 to allow it to plug into one or a plurality of interactive components 50. Additionally, a video display 17 may be provided as an alternative or for concurrent use with the interactive component 50.

Figure 8:
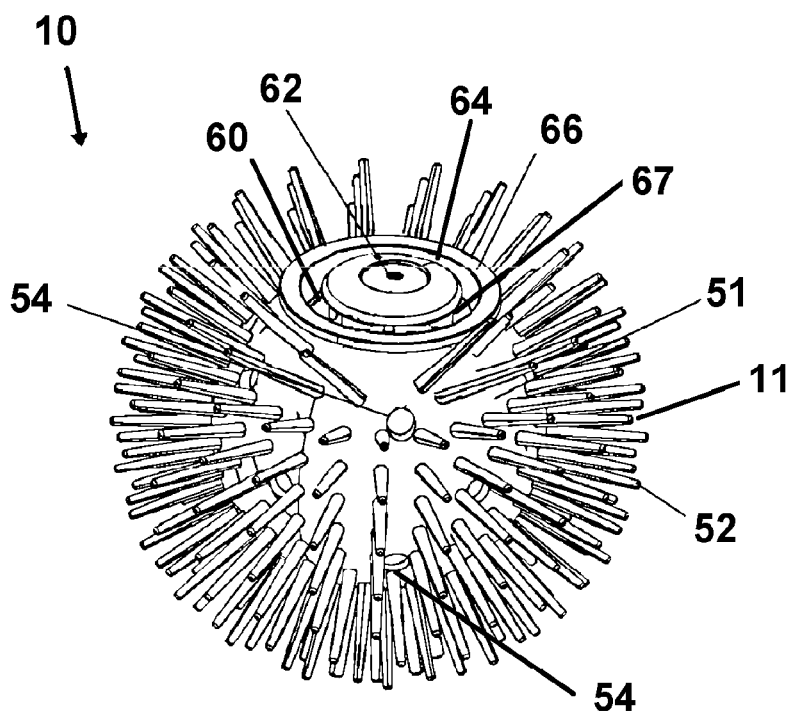
FIG. 8 shows another particularly preferred mode of the device showing the hand-washing component used during game-play provided by a soft squeezable bubble producing shell having flexible radially disposed projections.
Figures 12, 12A:
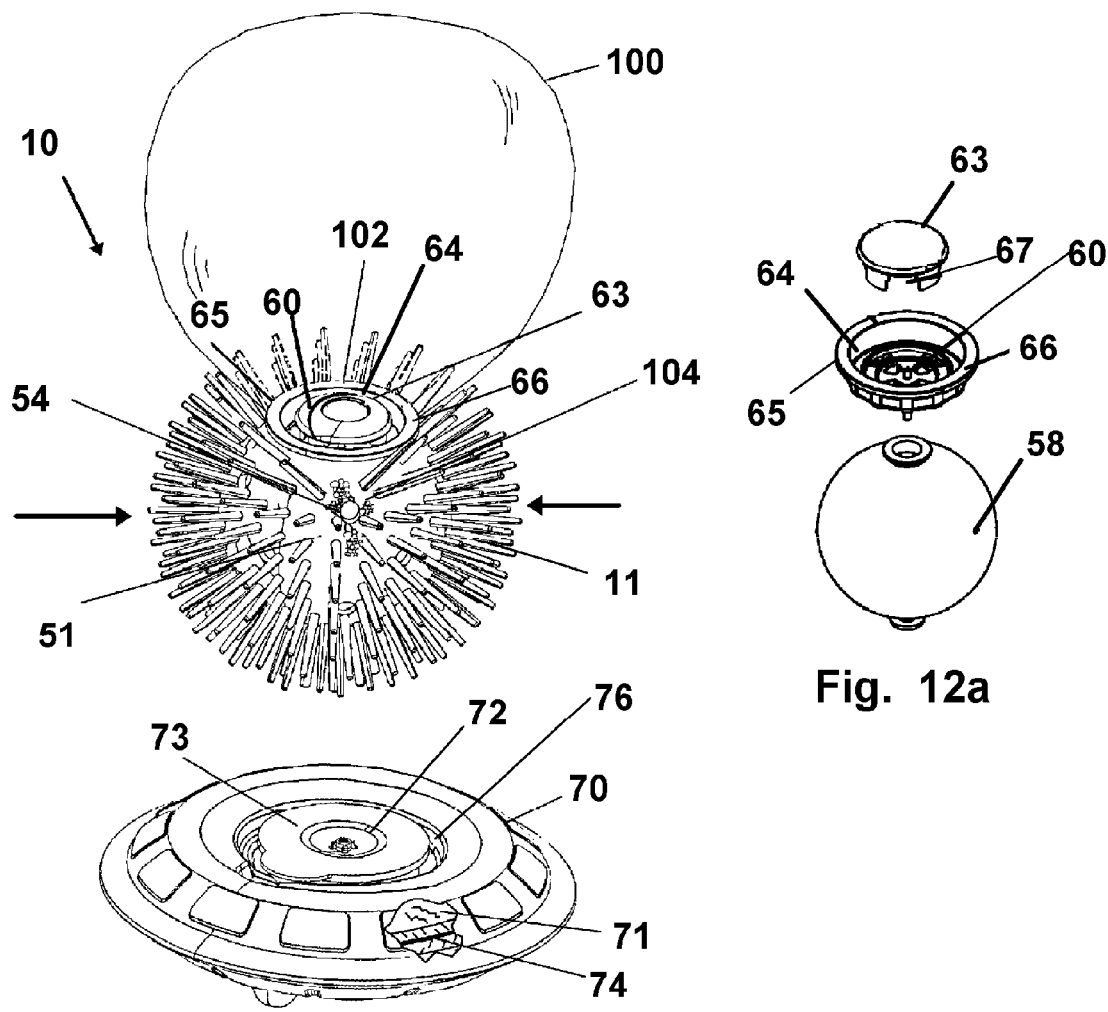
FIG. 12 depicts the bubble produced during game-play by a user squeezing the shell of the hand washing component wherein the flexible members are biased against, and scrub the skin.
FIG. 12a shows the one way valve in exploded view in line with the bladder providing air thereto during compression.

As seen in FIG. 8 there is another particularly preferred mode of the device 10 wherein the user plays a game with a hand washing component 11 which is hand powered and operated by a user's force of compression with their hands. In this particularly preferred mode of the device 10, the hand washing component 11 is formed of a generally hollow and spherical shell 51 made of substantially soft and malleable rubber or plastic, defines a squeezable means for hand washing which concurrently provides playful positive reinforcement to the user to continue squeezing to play the bubble game, and therefor washing, through the provision of a means for bubble formation (FIG. 12).

The squeezable hand washing component 11 features a means for scrubbing the palms of the user's hands through a plurality of members 52 projecting generally radially from the outer surface of the shell 51 of the washing component 11. These members 52 form an array of similarly soft and malleable rubber projecting members 52 projecting in all directions from an imaginary center point within the washing component 11. The members 52 are formed in a plastic fashion and if deformed exert a bias in the direction to reassume their original position and shape. When the shell 51 is squeezed, deforming the members 52, the continually bias against the skin of the user and provide a scrubbing means to dislodge dirt and debris from the users hands when in use.

Figure 9:
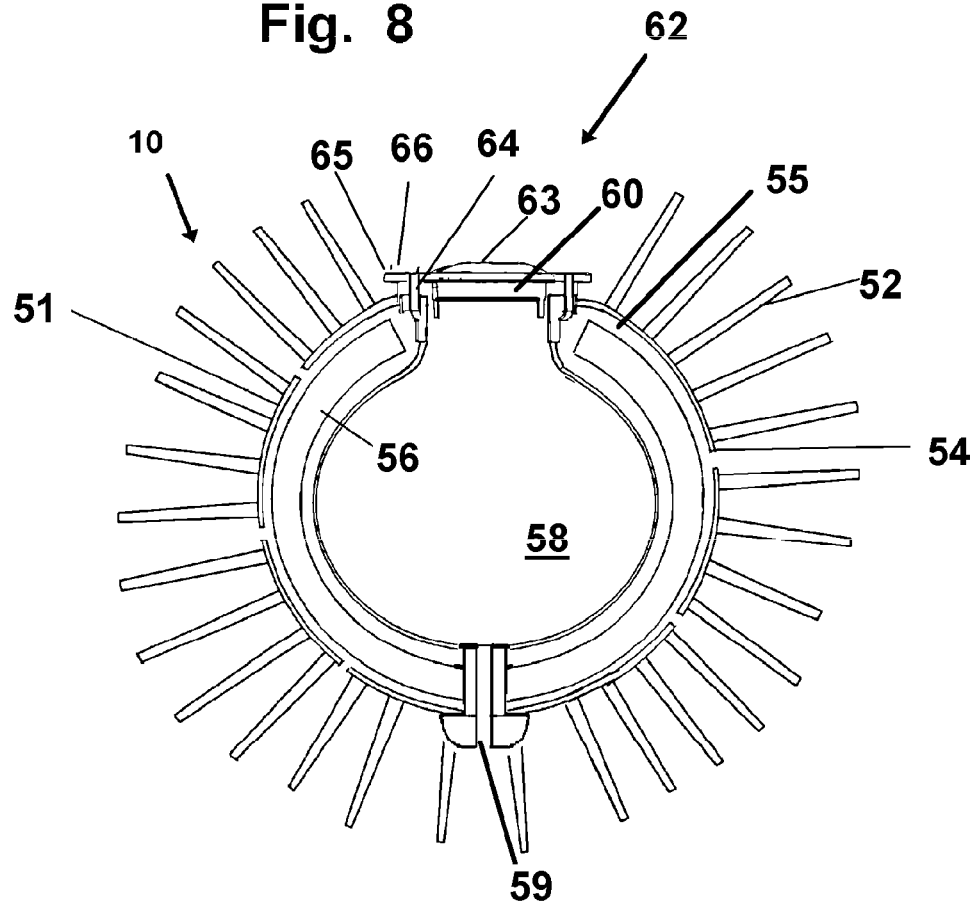
FIG. 9 is a cross-sectional view of the shell portion of the device of the particularly preferred mode of FIG. 8 showing the internal bladder and soft foam portions.

Additionally included in the shell 51 are a plurality of small apertures 54 which communicate through the relatively thin pliable wall of the shell 51 and provide a means to communicate hand washing solution therein to foam 56 in the cavity 55 between the exterior of the bladder 58 and the interior wall of the shell 51 (FIG. 9). The foam 56 is open cell and absorbs the solution and creates foaming soap when the hand washing component 11 is squeezed. This foamy soap is communicated to the hands of the user though the apertures 54 during squeezing.

A one way valve 60 located within a surrounding exhaust aperture 62 provides a means for one-way communication and a release of air from the interior of the bladder 58 in one direction, when the bladder 58 is squeezed. The one way nature of air flow from the bladder 58 through the one way valve 60 also keeps water and soap solution from being sucked into the bladder 58 as it re-inflates.

FIG. 9 shows a cross-sectional view of the device 10 in the current particularly preferred mode. The internal bladder 58 is engaged to the one way valve 60 located within the exhaust aperture 62. A porous and preferably antimicrobial membrane such as open cell foam 56 is positioned in a cavity 55 formed between the exterior surface of the bladder 58 and the interior surface of the surrounding shell 51, and provides a means to create a lather or foaming effect with the hand washing solution as it passes through the plurality of apertures 54 communicating from the cavity 55 through the shell 51 during a squeeze.

An elongated air inlet aperture 59 provides a means for air to pass to the interior of the bladder 58 from the exterior of the shell 51, and to re-inflate the bladder 58 after being squeezed by the user to blow bubbles. The air inlet aperture 59 is designed to provide an air volume flow rate therethrough which is less than the volume of air capable of being exhausted by the one way valve 60 during a squeezing of the bladder 58. Therefor when squeezed by the user, a majority of air flowing out of the bladder 58 is communicated through the path of least resistance of the one way valve 60 in the exhaust aperture 62, with little to no air flowing through the intake aperture 59. The small size of the elongated inlet aperture 59 does however provide a relief from over pressure of air passing through the one way valve 60 if the device is squeezed too hard, and thereby prevent the user from causing an exhausting air flow which would pop or prevent the bubble 100 (FIG. 12) from forming.

With the one way valve 60 preventing airflow back to the interior of the bladder 58, when compression from squeezing ceases, re-inflation occurs. During re-inflation air fills the bladder 58 interior through the elongated inlet aperture 59 and does so with sufficient flow to inflate the bladder 58 to allow for a repetitive squeezing. Alternatively, the air inlet aperture 59 may employ an engaged check valve to limit flow to one direction in the form of a similar to the one way valve 60, but only allowing inflow of air to the bladder 58. Currently, the open elongated inlet aperture 59 is preferred due to its action as a relief from over-pressure during squeezing to prevent bubble popping. Further, during play by the user, holding the hand washing component 11 with the one way valve 60 upright, should any soap or water have inadvertently entered the bladder 58, it is expelled through the inlet aperture 59 which is purposely positioned to be at the lowest point on the hand washing component 11 when in the upright or playing position shown in FIG. 12.

Figure 10:
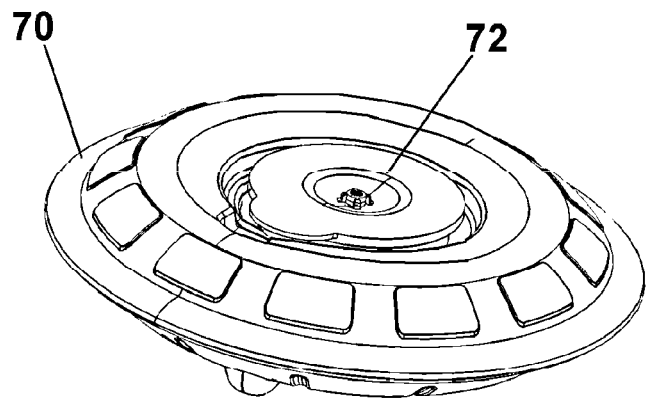
FIG. 10 shows a compressible base component of this second particularly preferred mode of the device of FIG. 8 configured to hold soap and communicate a measured amount to the hand washing component during compression.
Figure 11:
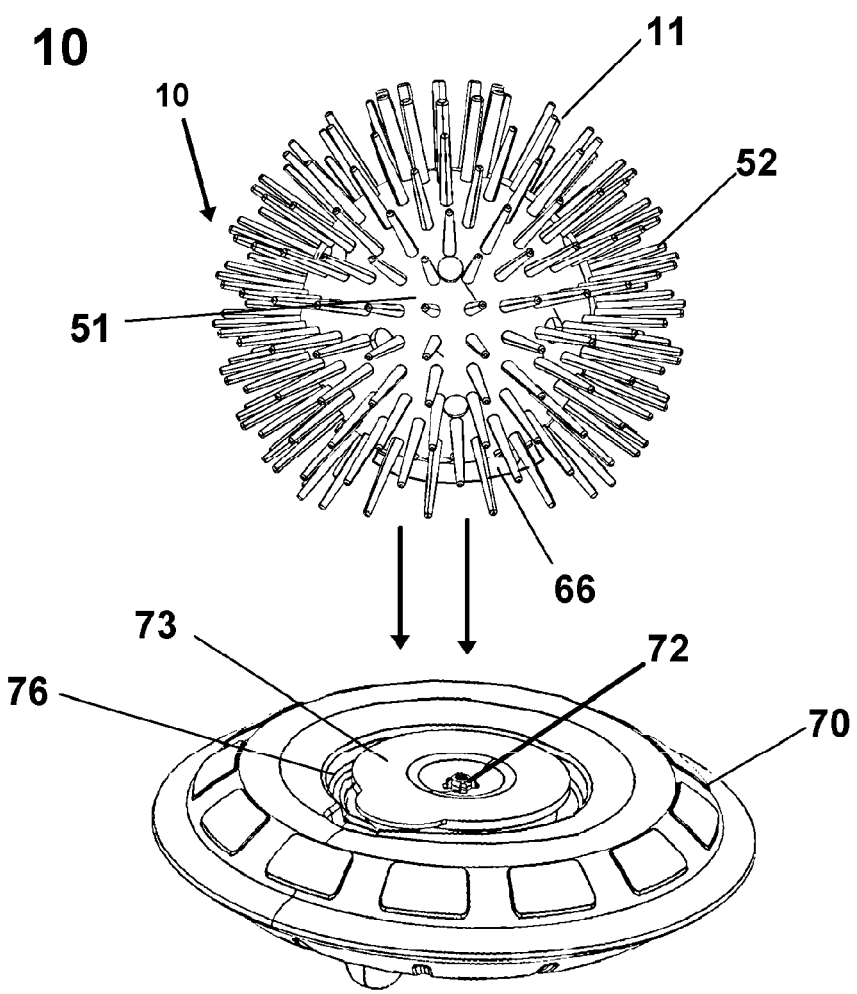
FIG. 11 shows a view of this current particularly preferred mode of the device showing the inverted position of the hand washing component in position for compression of the base component.

FIGS. 10 and 11 shows the use of the remote base 70 of the depicted preferred mode of the device 10 in combination with the hand washing component 11. The base 70 provides a means to store and communicate the hand washing solution 71 as well as provides a convenient way to apply hand washing solution to the hand washing component 11 and into the annular cavity 64 surrounding the one way valve 60 located in the exhaust aperture of the shell 51 for producing bubbles.

A valve 72 on the base 70 provides a spill proof means to store the hand washing solution as it only communicates solution from an interior cavity holding a supply of solution which is only dispensed during compression of the base 70. The compression is provided by pushing the inverted hand washing component 11 in FIG. 11, against the base 70 with the planar surface 66 surrounding the one way valve 60 of the hand washing component 11 mated to the annular planar surface 73 surrounding the valve 72 of the base 70. The two planar surfaces 66 and 73 provide a means for sealed engagement between the base 70 and the hand washing component 11 during a compression of the base 70.

When compressed by the hand washing component 11 in this fashion, the base 70 acts similar to a bellows in that during communication of compression from the washing component 11 against the base 70, the base 70 compresses the sidewall of the base 70 and its interior cavity shrinks thereby causing a dispensing of the washing solution 71 through the valve 72 from an internal supply therein.

An internal hard stop 74 within the base 70 may be employed to provide a means to limit the range of compression of the base 70 during cooperative application of the hand washing component 11 in a compression. The stop 74 thereby provides a means to eject a measured amount of soap 71 from the base 70 as the base 70 stops collapsing on the interior cavity holding the soap 71 ceasing ejection thereof.

An annular cavity 76 surrounding the one way valve 72 acts as a reservoir for the hand washing solution 71 from the base 70 and is sized to hold a volume thereof. As the hand washing component 11 is tipped upright, to a play position, by the user on removal from the base 70 the measured volume in the annular cavity 76 remains. Surface tension and the nature of such thick soapy solutions causes the volume of soapy solution to remain in the cavity 76 during transition from an inverted position against the base 70 to the upright position prior to a squeezing.

Additionally, when the hand washing component 11 is removed from contact with the base 70, the washing solution 71 from the base 70 is deposited the annular cavity 76 surrounding the one way valve 72, and the base 70 returns to its enlarged shape. Force to return the base 70 to an enlarged condition from the compressed condition is provided by a biasing means provided by the plastic material the base 70 is formed of, or if needed an interior biasing means such as a spring (not shown) to rebound to its enlarged or original shape. This creates a suction action internally which draws any remaining soap solution 71 back into its internal cavity.

As also in FIGS. 12 and 12a are shown the device 10 wherein the hand washing component 11 is employed to blow bubbles 100. As can be discerned the annular cavity 64 surrounding the one way valve 60 of hand washing component 11, once tipped upright by the user and separated from the reservoir base 70, soap solution retained in the annular cavity 64 surrounding the valve component and underneath the diffuser 63. The depth of the annular cavity 64 provides a determined volume to hold the soapy solution and therefor a means to place a measured amount of soapy solution, in the annular cavity 64 during compression of the base, to the hand washing component 11. Surface tension and the nature of such thick soapy solutions causes this volume of soapy solution to remain in the annular cavity 64 during transition from an inverted position against the base, to the upright or bubble-blowing position prior to a squeezing as in FIG. 12.

When the annular cavity 64 surrounding the one way valve 60 retaining the soap supply dispensed by the base 70, a thin layer of hand washing solution or soap or the like, adheres to the sharp edge 65 of the interior ring or circumference of the annular planar surface 66 surrounding the one way valve 70 and spaced from the edge of the diffuser 63. In blowing a bubble 100, as seen in FIG. 12, the device 10 when separated from contact with the base 70 and turned upright is squeezed by the user. When squeezed by a user, air communicated from the bladder 58 during the squeeze is communicated through the one way valve 60 exiting behind a planar plate of the diffuser 63, which is forced gaps 67 and through an annular cavity 64 to exit in a circular fashion around the diffuser 63 and cause a bubble 100 to form. The device may function without the diffuser 63 however it is preferred since it provides a means to buffer the air forced from the bladder and prevent breaking the bubble from too much air force.

The base 102 of the bubble 100 remains locked at the annular edge 65 of the planar surface 66 surrounding the one way valve 60 due to the surface tension and resulting fluid adhesive qualities of the hand washing solution thereby allowing the user to continue to inflate the bubble 100 larger and larger. Suds 104 formed by soapy solution and the interior foam, can also be seen coming from the aperture 54. The squeezing and creation of bubbles 100 provides the user a game which is a playful and positive means to induce a continued squeezing thereby washing his hand while concentrating on the game.

As can be seen in both modes of the device, a user is encouraged by the distraction of game playing, to cause a hand washing component to clean their hands. While both device operate to passively cause the user to wash his hands by manipulating a controller to accomplish a task in the depicted fashion, as shown in the drawings and described in detail herein which discloses arrangements of elements of particular construction and configuration for illustrating preferred embodiments of structure and method of operation of the present invention. As noted above, it is to be understood that elements of different construction and configuration and other arrangements thereof, other than those illustrated and described may be employed for providing an apparatus using video games and depictions controlled by a hand washing controller in accordance with the spirit of this invention, any such changes, alternations and modifications as would occur to those skilled in the art are considered to be within the scope of this invention as broadly defined in the appended claims.

What is claimed is:

1. An apparatus for hand washing and concurrently providing a visual interaction with a user, said apparatus having a hand washing component, comprising:
   a substantially spherical shell having a sidewall with an exterior surface;
   an interior cavity of said shell defined by said sidewall;
   said shell formed of malleable material deformable by a hand compression of a user;
   an exhaust aperture on a first side of said shell, said exhaust aperture communicating through said sidewall with said interior cavity;
   projections extending from said exterior surface;

a bladder housed within said interior cavity, said bladder having an internal cavity surrounded by a bladder wall;

a gap between said bladder wall and said sidewall;

an intake conduit communicating through said sidewall with said internal cavity, said intake providing a path for air to enter said internal cavity;

an exhaust conduit communicating between said internal cavity and a one-way valve positioned in said exhaust aperture;

said exhaust conduit communicating air from said internal cavity through said one-way valve during a compression of said hand washing component by a squeeze of a user's hand;

an aperture operatively positioned to receive exhausting air communicated from said internal cavity through said one-way valve, during a said squeeze;

means for a communication of a soapy solution to said aperture and said exterior surface of said shell;

said aperture configured to form a liquid film therein subsequent to a said communication of said soapy solution;

said liquid film adapted to form said visual interaction in the form of a bubble, using said exhausting air communicated there-against during a said squeeze; and said projections providing means for a scrubbing of said user's hand during said squeeze, whereby said user squeezing said hand washing component to form a said bubble is concurrently provided with said scrubbing of their hand.

2. The apparatus for hand washing of claim 1, additionally comprising:

an open cell foam membrane positioned in said gap;

at least one fluid aperture communicating through said sidewall between said gap and said exterior surface;

said fluid aperture providing means to communicate said soapy solution to said foam membrane;

said foam membrane configured to produce suds from said soapy solution, during a said squeeze by a user;

said fluid aperture providing means for communication of said suds to said hand of said user during a said squeeze; and said suds providing means for an enhancement of said scrubbing of said user's hand.

3. The apparatus for hand washing of claim 2, additionally comprising:

said intake conduit having a smaller diameter than said exhaust conduit;

said intake conduit exhausting a portion of said air during a said squeeze;

said portion of air exhausted providing means to regulate said exhausting air communicated against said liquid film to a maximum volume of said exhausting air; and regulating said exhausting air to said maximum volume providing a means to enhance formation of said bubble through an elimination of excess said exhausted air likely to pop said bubble prematurely.

4. The apparatus for hand washing of claim 3 additionally comprising:

a diffuser centrally located in said aperture operatively positioned to receive exhausting air;

said diffuser having a perimeter edge substantially paralleling an aperture edge defining said aperture;

an annular gap formed between said perimeter edge of said diffuser and said aperture edge;

said film forming within said annular gap; and said exhausting air communicating with said film after a first communication against said diffuser.

5. The apparatus for hand washing of claim 3, additionally comprising:

a base component, said base component configured for a mating with said hand washing component on said first side of said shell;

said base component having an interior cavity sized to hold a reservoir of said soapy solution; and compression of said hand washing component against said base component in said mating providing means to activate said base component to communicate said soapy solution to said hand washing component.

6. The apparatus for hand washing of claim 4, additionally comprising:

a base component, said base component configured for a mating with said hand washing component on said first side of said shell;

said base component having an interior cavity sized to hold a reservoir of said soapy solution; and compression of said hand washing component against said base component in said mating providing means to activate said base component to communicate said soapy solution to said hand washing component.

7. The apparatus for hand washing of claim 2 additionally comprising:

a diffuser centrally located in said aperture operatively positioned to receive exhausting air;

said diffuser having a perimeter edge substantially paralleling an aperture edge defining said aperture;

an annular gap formed between said perimeter edge of said diffuser and said aperture edge;

said film forming within said annular gap; and said exhausting air communicating with said film after a first communication against said diffuser.

8. The apparatus for hand washing of claim 7, additionally comprising:

a base component, said base component configured for a mating with said hand washing component on said first side of said shell;

said base component having an interior cavity sized to hold a reservoir of said soapy solution; and compression of said hand washing component against said base component in said mating providing means to activate said base component to communicate said soapy solution to said hand washing component.

9. The apparatus for hand washing of claim 7, additionally comprising:

said projections extending from said exterior surface being a plurality of elongated members extending from an attachment to a distal;

each of said elongated members projecting along an axis running substantially radially from said exterior surface;

said elongated members exerting a biasing force against any deflection from said projecting along a said axis of said elongated members during a said squeeze;

said biasing force providing means to enhance said scrubbing of said user's hand by increasing a force of contact between said projections and said user's hand.

10. The apparatus for hand washing of claim 2, additionally comprising:

a base component, said base component configured for a mating with said hand washing component on said first side of said shell;

said base component having an interior cavity sized to hold a reservoir of said soapy solution; and compression of said hand washing component against said base component in said mating providing means to activate said base component to communicate said soapy solution to said hand washing component.

11. The apparatus for hand washing of claim 2, additionally comprising:
said projections extending from said exterior surface being a plurality of elongated members extending from an attachment to a distal;
each of said elongated members projecting along an axis running substantially radially from said exterior surface;
said elongated members exerting a biasing force against any deflection from said projecting along a said axis of said elongated members during a said squeeze;
said biasing force providing means to enhance said scrubbing of said user's hand by increasing a force of contact between said projections and said user's hand.

12. The apparatus for hand washing of claim 1, additionally comprising:
said intake conduit having a smaller diameter than said exhaust conduit;
said intake conduit exhausting a portion of said air during a said squeeze;
said portion of air exhausted providing means to regulate said exhausting air communicated against said liquid film to a maximum volume of said exhausting air; and
regulating said exhausting air to said maximum volume providing a means to enhance formation of said bubble through an elimination of excess said exhausted air likely to pop said bubble prematurely.

13. The apparatus for hand washing of claim 12 additionally comprising:
a diffuser centrally located in said aperture operatively positioned to receive exhausting air;
said diffuser having a perimeter edge substantially paralleling an aperture edge defining said aperture;
an annular gap formed between said perimeter edge of said diffuser and said aperture edge;
said film forming within said annular gap; and
said exhausting air communicating with said film after a first communication against said diffuser.

14. The apparatus for hand washing of claim 13, additionally comprising:
a base component, said base component configured for a mating with said hand washing component on said first side of said shell;
said base component having an interior cavity sized to hold a reservoir of said soapy solution; and
compression of said hand washing component against said base component in said mating providing means to activate said base component to communicate said soapy solution to said hand washing component.

15. The apparatus for hand washing of claim 12, additionally comprising:
a base component, said base component configured for a mating with said hand washing component on said first side of said shell;
said base component having an interior cavity sized to hold a reservoir of said soapy solution; and
compression of said hand washing component against said base component in said mating providing means to activate said base component to communicate said soapy solution to said hand washing component.

16. The apparatus for hand washing of claim 1 additionally comprising:
a diffuser centrally located in said aperture operatively positioned to receive exhausting air;
said diffuser having a perimeter edge substantially paralleling an aperture edge defining said aperture;
an annular gap formed between said perimeter edge of said diffuser and said aperture edge;
said film forming within said annular gap; and
said exhausting air communicating with said film after a first communication against said diffuser.

17. The apparatus for hand washing of claim 16, additionally comprising:
a base component, said base component configured for a mating with said hand washing component on said first side of said shell;
said base component having an interior cavity sized to hold a reservoir of said soapy solution; and
compression of said hand washing component against said base component in said mating providing means to activate said base component to communicate said soapy solution to said hand washing component.

18. The apparatus for hand washing of claim 16, additionally comprising:
said projections extending from said exterior surface being a plurality of elongated members extending from an attachment to a distal;
each of said elongated members projecting along an axis running substantially radially from said exterior surface;
said elongated members exerting a biasing force against any deflection from said projecting along a said axis of said elongated members during a said squeeze;
said biasing force providing means to enhance said scrubbing of said user's hand by increasing a force of contact between said projections and said user's hand.

19. The apparatus for hand washing of claim 1, additionally comprising:
a base component, said base component configured for a mating with said hand washing component on said first side of said shell;
said base component having an interior cavity sized to hold a reservoir of said soapy solution; and
compression of said hand washing component against said base component in said mating providing means to activate said base component to communicate said soapy solution to said hand washing component.

20. The apparatus for hand washing of claim 1, additionally comprising:
said projections extending from said exterior surface being a plurality of elongated members extending from an attachment to a distal;
each of said elongated members projecting along an axis running substantially radially from said exterior surface;
said elongated members exerting a biasing force against any deflection from said projecting along a said axis of said elongated members during a said squeeze;
said biasing force providing means to enhance said scrubbing of said user's hand by increasing a force of contact between said projections and said user's hand.

* * * * *